United States Patent [19]

Washio

[11] Patent Number: 5,329,385
[45] Date of Patent: Jul. 12, 1994

[54] COLOR CORRECTION DEVICE HAVING A COLOR CONVERSION FUNCTION

[75] Inventor: Koji Washio, Hachioji, Japan

[73] Assignee: Konica Corporation, Tokyo, Japan

[21] Appl. No.: 954,046

[22] Filed: Sep. 29, 1992

[30] Foreign Application Priority Data

Oct. 2, 1991 [JP] Japan ................. 3-255350
Mar. 23, 1992 [JP] Japan ................. 4-064894

[51] Int. Cl.⁵ .............................. H04N 1/46
[52] U.S. Cl. ........................... 358/515; 358/523; 358/501; 358/529
[58] Field of Search ............. 358/529, 521, 518, 515, 358/523, 524, 530, 531, 519, 501

[56] References Cited

U.S. PATENT DOCUMENTS 4,953,013 8/1990 Tsuji et al. .................. 358/515
4,972,256 11/1990 Hirosawa et al. ............ 358/523
5,014,124 5/1991 Fujisawa ..................... 358/530

Primary Examiner—Mark R. Powell
Assistant Examiner—Fan Lee
Attorney, Agent, or Firm—Finnegan, Henderson, Farabow, Garrett & Dunner

[57] ABSTRACT

An apparatus for producing CMYK recording color component signal for each pixel in which RGB color component signal photoelectrically obtained from the original is converted into CMY color component signals. The converted CMY color component signals are separated into first, second and black color sub-component signals which are corrected respectively. Thereafter, the corrected first, second and black sub-component signals are added so as to form the recording color.

14 Claims, 7 Drawing Sheets

COLOR CORRECTION DEVICE HAVING A COLOR CONVERSION FUNCTION

BACKGROUND OF THE INVENTION

The present invention relates to a color correction device that performs color correction when image information of a document image read by a color image forming apparatus is outputted to a printer, or image information in a facsimile is outputted to a printer, and more particularly relates to a color correction device having a color conversion function.

Recently, color reproducibility of very high accuracy is required for full color images. Accordingly, a color correction method of simple linear masking is not sufficient. Therefore, more accurate methods have been proposed, including a 2 stage masking method, a nonlinear masking method, an LUT (look-up-table) system, and a method solving a Neugebauer Equation.

However, these highly accurate methods are disadvantageous in that: the hardware becomes complicated; and further the adjusting operation is not simple. For example, when it is required to change the shade of a color and one coefficient is carelessly changed, colors that are not required to be changed are also influenced, and further gray balance is affected. In order to solve the aforesaid problems, it is necessary to find a correction coefficient through a complicated calculation. As described above, there are many problems from the viewpoint of operability.

A color conversion method by which a specific color on a document is converted into another color, is utilized in the field of designing. However, after color conversion has been completed, a color boundary appears on a periphery of the color-converted portion. Therefore, partial correction such as retouching is required. In the case of a color component conversion system, it is not necessary to perform partial correction. In the aforementioned case, however, the range of color conversion becomes wide, so that even colors not to be converted are influenced, and the gray balance is lost. Furthermore, in order to provide a color correction device with color conversion function, it is necessary to install hardware for color conversion that is provided separately from the color correction device. Consequently, the cost is raised.

SUMMARY OF THE INVENTION

It is a primary object of the present invention to provide a color correction device having a color conversion function that can realize highly accurate color correcting, and high level color conversion by which the appearance of a color boundary can be avoided and gray balance is not lost, without conducting partial retouching on an image. In this case, the aforementioned highly accurate color correcting and high level color conversion can be realized by using the same hardware.

The present invention has been achieved in order to accomplish the aforementioned object. The present invention is to provide a color correction device having a color conversion function comprising: a color masking means that converts an RGB signal into a CMY signal by a matrix calculation; a black separation means that separates all black components from the CMY signal; a first and second color separation means that divides the CMY signal from which the black component has been separated, into first and second color components; a black correction means that corrects the black component which has been separated; a second color correction means that corrects the separated second color component; a first color correction means that corrects the separated first color component; an addition output means that adds signals outputted from the aforementioned correction means; a group of data registers that hold plural kinds of color material component ratio data; and a memory that can store plural kinds of color material component ratio data, wherein the data register group can hold at least color material component ratio data to separate a red component, color material component ratio data to separate a green component, color material component ratio data to separate a blue component, color material component ratio data to separate a black component, color material component ratio data to separate a cyan component, color material component ratio data to separate a magenta component, and color material component ratio data to separate a yellow component. Further, the color correction device having a color conversion function of the present invention is characterized in that: in the black component correction means, color material component ratio data (C:M:Y:K) to correct a black component is multiplied by the amount of the black component so that a CMYK signal is outputted; in the second color component correction means, the second color is classified into one of red, green and blue, and color material component ratio data (C:M:Y:K) to correct the classified color is multiplied by the amount of the second color component so that CMYK density of the second color is outputted; and in the first color component correction means, the first color is classified into one of cyan, magenta and yellow, color material component ratio data (C:M:Y:K) to correct the classified color is multiplied by an amount of the first color component so that CMYK density of the first color is outputted.

FIG. 1 is a block diagram showing the structure of the color correction device having a color conversion function of the present invention. As shown in the block diagram, the color correction device having a color conversion function of the present invention is essentially operated in the following manner: after linear masking has been carried out, a color signal is divided into a black component, second color component and first color component; color correction of each color is performed almost independently; and then the color components are combined to be outputted.

First, in the linear masking means (1), a signal is converted into a CMY density signal by the matrix calculation of 3×3. Next, in the black separation means (2), a black component is separated from the CMY density signal. In the black correction means (3), a signal is outputted in the form of a CMYK signal in which the gray balance is maintained, and the signal is inputted into the addition output means (7). On the other hand, the C'M'Y' signal from which the black component has been removed, is divided into the first and second color components by the first and second color separation means (4). Then, the first color component is sent to the first color correction means (5), and the second color component is sent to the second color correction means (6). After the correction has been completed, the signal is outputted in the form of the CMYK signal, and inputted into the addition output means (7). In the addition output means (7), the corrected first color component, second color component and black component are added at each CMYK and outputted.

DETAILED DESCRIPTION OF THE PREFERRED EMBODIMENT

The color correction device having a color conversion function of the present invention is operated under the following condition: an image reading apparatus such as a scanner, or an apparatus outputting image signals is connected with the input side of the apparatus of the invention; and an image outputting apparatus such as a printer is connected with the output side of the apparatus of the invention.

An example will be explained in which the color correction device having a color conversion function of the invention is applied to an electrophotographic type color image forming apparatus.

Figure 1:
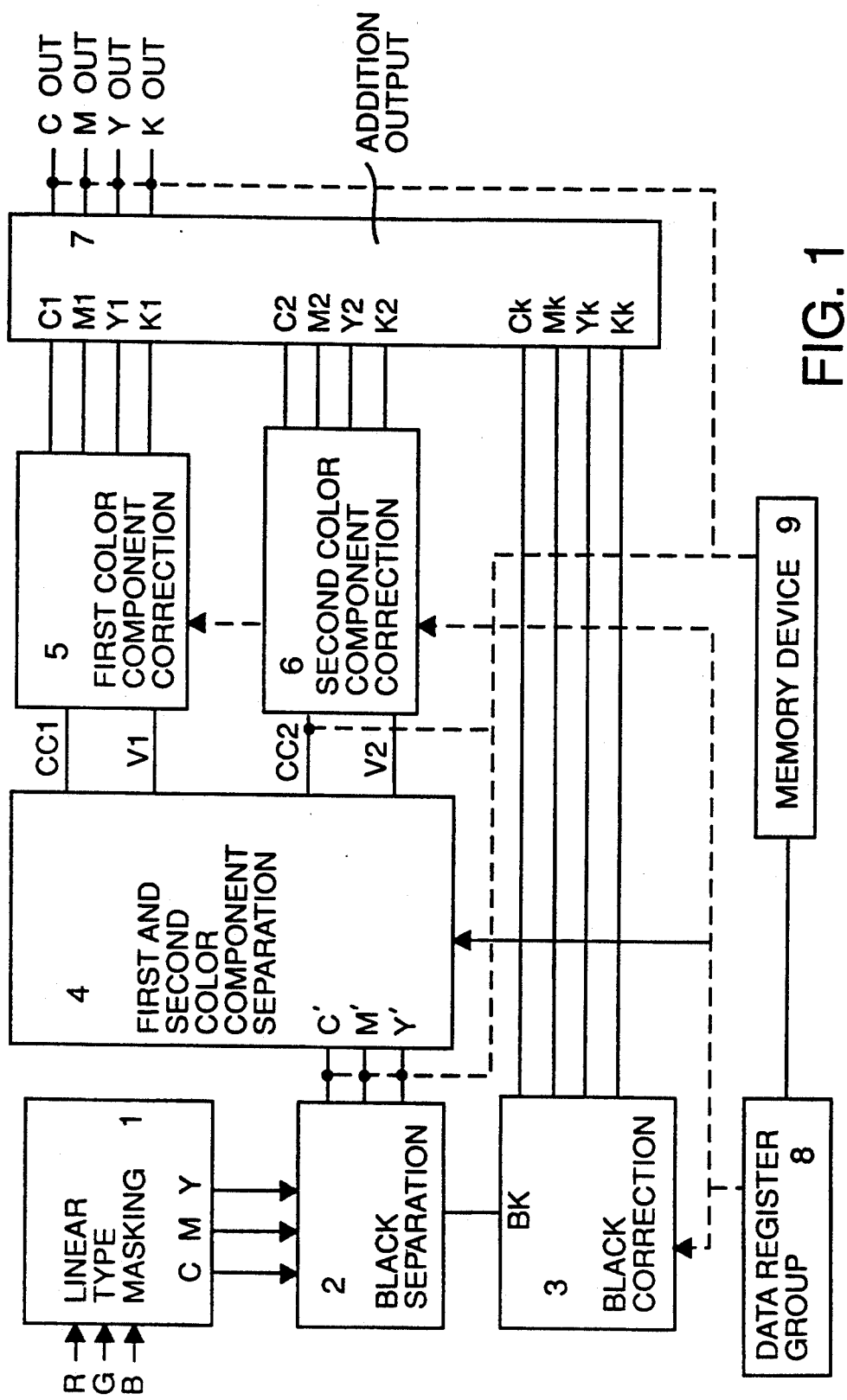
FIG. 1 is a block diagram of the color correction device having a color conversion function of the present invention.
Figure 2:
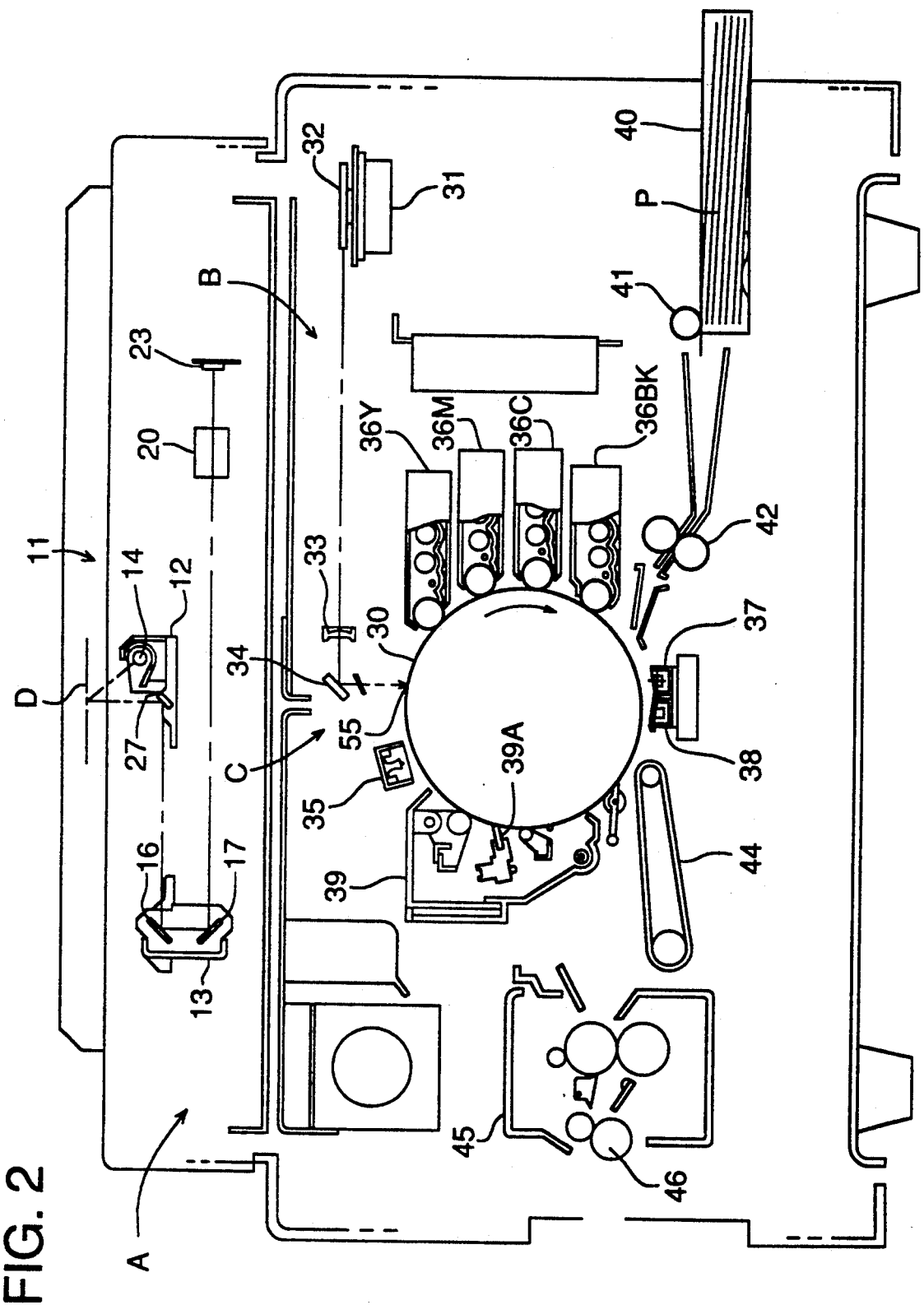
FIG. 2 is a schematic illustration showing the structure of a color image forming apparatus to which the present invention is applied.

FIG. 2 is a sectional view showing an example of a color image forming apparatus. This color image forming apparatus includes image reading system A, image signal processing system B, laser writing system C and image forming section D.

The upper portion of the image forming apparatus is provided with a document stack section 11 including a platen made of a transparent glass plate, and a document cover that covers a document placed on the platen. Under the platen is provided an image reading system A including a first mirror unit 12, second mirror unit 13, primary lens 20, and color CCD23. The first mirror unit 12 is provided with an exposure lamp 14 and first mirror 15. The first mirror unit 12 is installed in the apparatus in the following manner: it can be linearly moved in the lateral direction in parallel with the platen, so that all the document surface can be optically scanned. A second mirror 16 and third mirror 17 are incorporated into the second mirror unit 13. The second mirror unit 13 is laterally moved in the same direction as the first mirror unit 12 at a speed ½ that of the first mirror unit 12 so that the optical passage length can be maintained to be a predetermined value. Of course, the second mirror unit 13 is moved in parallel with the platen in the same manner as the first mirror unit. An image on a document placed on the platen is exposed by the exposure lamp 14, and the image is formed on the color CCD23 by the primary lens 20 through the first mirror 15, second mirror 16 and third mirror 17. A scanning operation is described above. After the scanning operation has been completed, the first mirror unit 12 and second mirror unit 13 return to their initial positions and wait for the next operation.

Image data of each color obtained by the color CCD23 is processed by image signal processing system B, and the obtained image signal is outputted from laser writing system C.

Figure 3:
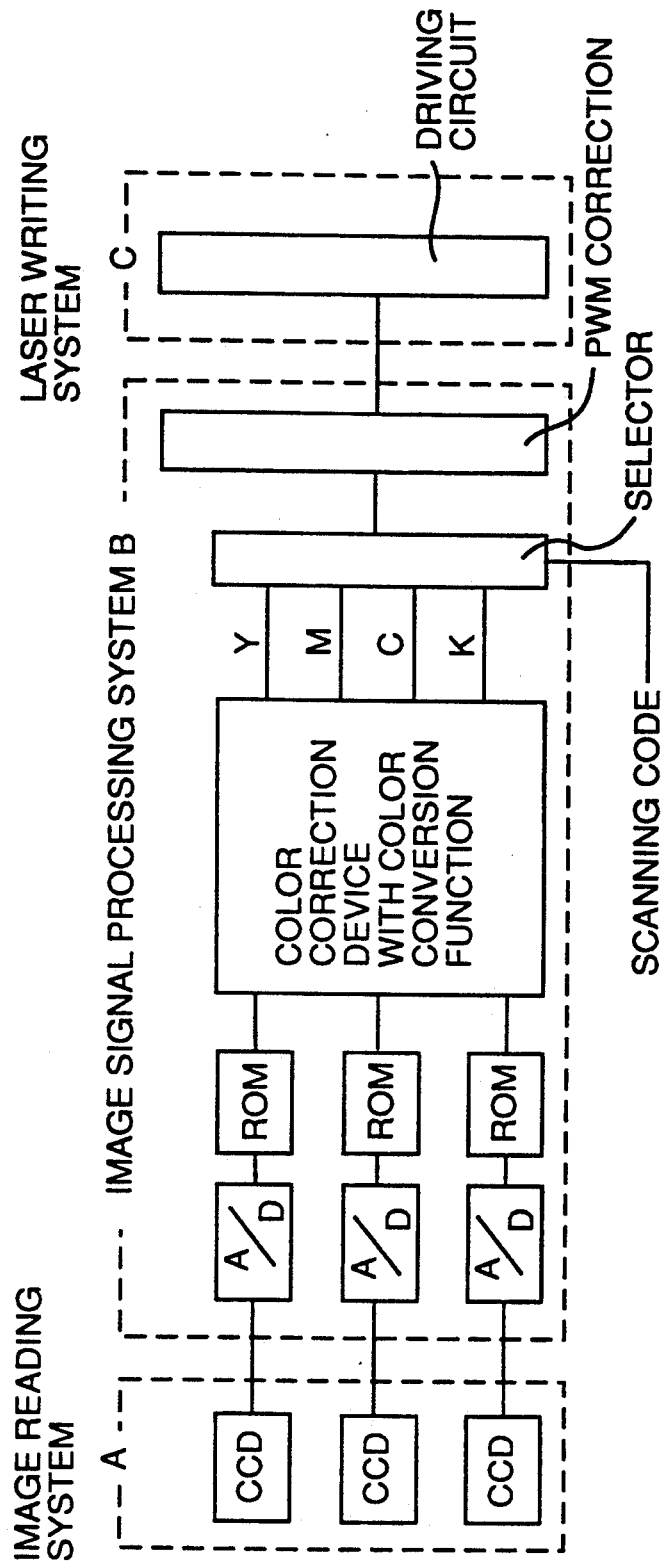
FIG. 3 is a block diagram showing the flow of an image processing signal.

Image signal processing system B is disposed on the reverse side of the color image forming apparatus, and includes the color correction device having a color conversion function of the present invention. FIG. 3 is a block diagram showing the flow from an image signal being supplied to image signal processing system B so as to be processed, to the processed signal being outputted. First, in image reading system A, the CCD color sensor outputs an image signal in the form of an analog signal of RGB at each pixel, and the outputted analog signal is supplied to image signal processing system B. Image signal processing system B comprises an A/D converter, density conversion ROM, color correction device, selector, and PWM correction device. The analog signal at each RGB supplied to image signal processing system B, is converted into an RGB digital signal at each pixel when the analog signal passes through the A/D converter. Then, the signal is further supplied to density conversion ROM so that it is converted into a density signal. This signal is supplied to the color correction device having a color conversion function of the present invention. As described later, in the color correction device, the signal is converted into a YMCK signal, and at the same time, the processing of color correction and color conversion is conducted on the signal, and then the signal is supplied to a selector. The selector selects one of the 4 signals of YMCK in accordance with a scanning code signal that is generated by a CPU in order to control the order of development, and the selected signal is outputted from the selector. The PWM correction device converts the signal into a signal that represents ON/OFF time of a laser, and the signal is supplied to laser writing system C.

Laser writing system C includes a drive motor 31, polygonal mirror 32, fθ lens (not shown), correction lens (not shown), semiconductor laser (not shown), and drive circuit (not shown). The drive circuit in the laser writing system conducts ON/OFF control of the semiconductor laser in accordance with the aforementioned signal.

Image forming section D includes a charger 35 provided around a photoreceptor drum 30, image exposure section 55, developing units 36Y, 36M, 36C, 36BK, transfer unit 37, separator 38, cleaning unit 39, paper supply cassette 40 disposed close to the photoreceptor drum 30, conveyance belt 44, and fixing unit 45.

The developing units 36Y, 36M, 36C, 36BK are provided in the following manner: the developing unit 36Y is disposed in the most upstream portion around the photoreceptor drum 30; and the developing unit 36BK accommodating black toner BK is provided in the most downstream position. Conventional toners are used for the color toners accommodated in the developing units 36Y, 36M, and 36C, and black toner BK. Therefore, the explanation of toners will be omitted here.

When a copy button provided outside the apparatus is pressed, image reading system A, image signal processing system B, laser writing system C and image forming system D are operated so that a color copy image can be formed. That is, when an image signal sent from image reading system A is inputted into laser writing system C through image signal processing system B by the control of the control section CPU, a copy operation is started. That is, the photoreceptor drum 30 is rotated clockwise in the arrowed direction, and electrical charge is uniformly given onto the photoreceptor drum surface. In the image exposure section 55, a yellow (Y) image corresponding to the document image is written on the photoreceptor with laser beams by laser writing system C, so that an electrostatic latent image can be formed on the photoreceptor surface. This electrostatic latent image is reversal-developed by the developing unit 36Y using Y toner, so that a visible Y toner image is formed. A bias voltage of DC or AC is impressed upon a developing sleeve having a magnetic roller of the developing unit 36Y so that the electrostatic latent image is developed by a 2 component developer by means of noncontact development. The photoreceptor drum 30 on which the Y toner image is formed, passes under the cleaning unit 39 that is withdrawn, and in the second rotation of the photoreceptor drum 30, the photoreceptor drum is electrically charged, and a magenta image is written by laser writing system C using laser beams, so that a magenta (M) image is formed on the aforementioned Y toner image. This latent image is reversal-developed by the developing unit 36M accommodating magenta toner, so that a M toner image is formed. In the same manner, cyan (C) and black (BK) toner images are formed on the photoreceptor drum.

Next, transfer papers P are conveyed from the paper supply cassette 40 one by one. Then, transfer paper P is supplied onto the surface of the photoreceptor drum 30 by a timing roller 42 that is operated synchronously with the movement of the aforementioned toner image. The toner image on the photoreceptor drum 30 is transferred onto transfer paper P by the action of the transfer unit 37. After that, transfer sheet P is separated from the photoreceptor drum 30 by the separator 38, and then transfer sheet P is conveyed to the fixing unit 45 through the conveyance belt 44 under the condition that the toner image is disposed upward.

Transfer paper P that has been subjected to fixing processing, is discharged outside through the discharge roller 46. The photoreceptor drum 30 continues to rotate, and the residual toner on the photoreceptor drum surface is recovered by the cleaning unit 39 having the cleaning blade 39A that has been returned to an operating position from the withdrawal position. In this manner, the photoreceptor drum 30 is prepared for the next image forming operation.

Next, the processing performed in the color correction device will be specifically explained as follows.

The color correction device having a color conversion function of the present invention is provided with a plurality of gate arrays.

First of all, the color correcting function will be explained as follows.

(1) Linear masking means

An RGB density signal is converted into a CMY density signal when it is subjected to the processing of linear masking (matrix calculation of 3×3). This process corrects muddiness of the color material of the image output apparatus, and the color separation characteristic of the scanner to some extent. Density signal CMY is sent to the black separation means (2).

(2) Black separation means

Figure 7:
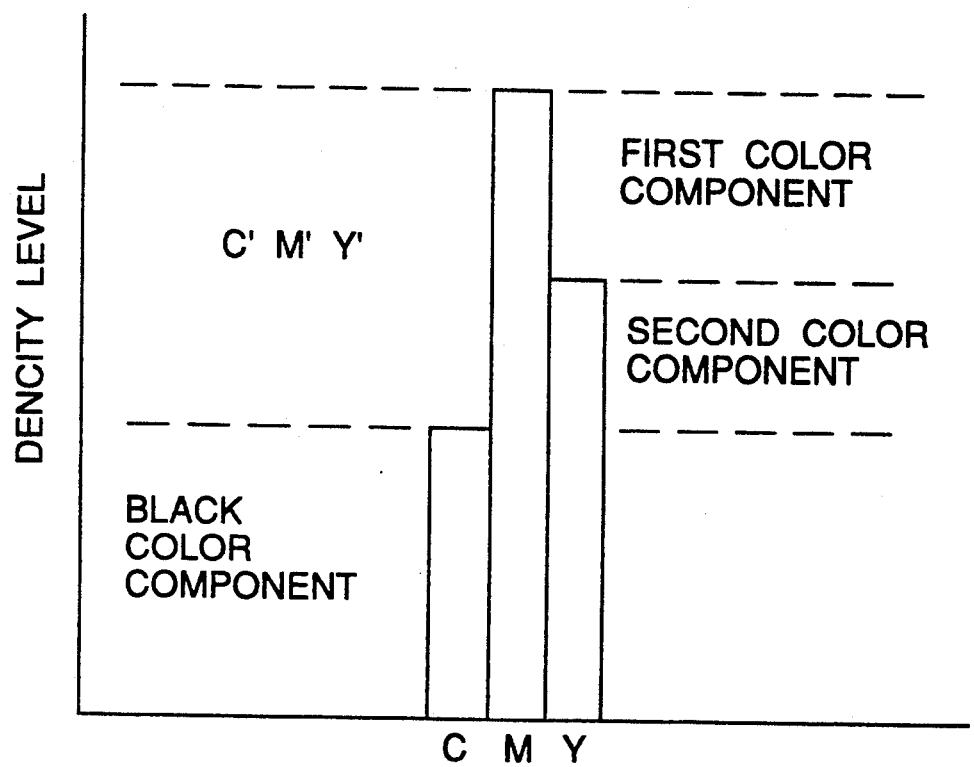
FIG. 7 is an illustration to explain an example of a color separation.

Density signal CMY is separated into black component BK and other color components C'M'Y' as shown in FIG. 7.

$$BK = \min(C, M, Y)$$

where min ( ): the minimum value is shown in ( ).

$$C' = C - BK$$

$$M' = M - BK$$

$$Y' = Y - BK$$

Black component BK is sent to the black correction means (3), and color components C'M'Y' are sent to the first and second color separation means (4).

(3) Black correction means

Separated black component BK is outputted to the addition output means (7) in the form of a CMYK signal ($C_K M_K Y_K K_K$).

$$K_K = BK \cdot UCR\%$$

$$C_K = BK \cdot (1 - UCR\%) \cdot \alpha_K$$

$$M_K = BK \cdot (1 - UCR\%) \cdot \beta_K$$

$$Y_K = BK \cdot (1 - UCR\%) \cdot \gamma_K$$

In this case, coefficients $\alpha_K$, $\beta_K$, $\gamma_K$ are equivalent neutral density when $B = G = R = 1.0$ (values are converted into density). These coefficients are held in the group of registers (8). When these coefficients are multiplied by black component BK, CMYK density $C_K M_K Y_K K_K$ in which gray is well balanced, can be obtained. In this example, UCR is utilized, and UCR% is a parameter showing a UCR ratio. In this example, density D of the start point of UCR is 0. However, when several equations are added, the start point of UCR can be changed.

(4) First and second color separation means

C'M'Y' density obtained by black separation processing is separated into a first color component and second color component. In this case, the following are specifically found: the kind of the first color component in C'M'Y' that is, which of C, M and Y is contained in the first color component, and how much of the component is contained; and the kind of the second color component, that is, which of R, G and B is contained in the second color component, and how much of the component is contained.

First, the color of the second color component in C'M'Y' is found, in other words, whether the second color component is R, G or B. Therefore, it is checked whether a complimentary color component is contained or not. At least, one of C'M'Y' is necessarily 0. For example, when C'=0 in the example of FIG. 7, it can be found that the second color component is R. In the same manner, when M'=0, the second color component is G, and when Y'=0, the second color component is B. This information about the color of the second color component is held in the form of color code CC2 until the processing corresponding to one pixel is completed. The correspondence between color code CC2 and color is shown in Table 1(b).

TABLE 1

CORRESPONDENCE BETWEEN COLOR CODES CC1 AND CC2

(a)

| CC1 | FIRST COLOR |
|---|---|
| 0 | There is no first color. |
| 1 | Cyan |
| 2 | Magenta |
| 3 | Yellow |

(b)

| CC2 | SECOND COLOR |
|---|---|
| 0 | There is no second color. |
| 1 | Red |
| 2 | Green |
| 3 | Blue |

Next, the amount of the second color component in C'M'Y' is found. In order to find the amount of the second color component, it is necessary to previously find the color material component ratio of the second color component. The color material component ratio can be found in the following manner. Color samples of 3 second colors (R, G, B) that are to be combined, are scanned by an image input device such as a scanner so that an RGB density signal is obtained. The obtained RGB density signal is subjected to the linear masking means (1) and black separation means (2) so as to obtain C'M'Y' respectively. This is the color material component ratio of the second color component. This color material component ratio is stored in the group of registers (8) being classified by the color (by the color code). These are defined as $CI_2$ (CC2), $MI_2$ (CC2) and $YI_2$ (CC2), then the amount of the second color component V2 can be found by the following equation.

$$V2 = \min(C'/CI_2(CC2), M'/MI_2(CC2), Y'/YI_2(CC2))$$

Next, the first color component is separated by the following equation.

$$C'' = C' - V2 \cdot CI_2(CC2)$$

$$M'' = M' - V2 \cdot MI_2(CC2)$$

$$Y'' = Y' - V2 \cdot YI_2(CC2)$$

Only one of C'', M'' and Y'' does not become 0, which is the color of the first color component. In the example of FIG. 7, the first color component is M. The color of the first color component is held as color code CC1 until the processing of one pixel is completed, and the value represents the amount of the component. This value is defined as V1. Correspondence between color code CC1 and color is shown in Table 1(a). As a result of the foregoing, the color and component amount of the first color component, and the color and component amount of the second color component, are found, and they can be expressed by 4 values (CC1, V1, CC2, V2).

Color code CC1 of the first color component, and amount V1 of the first color component, are sent to the first color correction means (5). Color code CC2 of the second color component, and amount V2 of the second color component, are sent to the second color correction means (6).

(5) First color correction means

The first color component that has been separated, is outputted to the addition output means (7) in the form of a CMYK signal ($C_1M_1Y_1K_1$). The color material component ratio of the first color for correction is stored in the group of data register (8) being classified by the color. When these values stored in the register are defined as $CO_1(CC1)$, $MO_1(CC1)$, $YO_1(CC1)$ and $KO_1(CC1)$, CMYK signals of the first color component after correction can be found by the following equations.

$$C_1 = CO_1(CC1) \cdot V1$$

$$M_1 = MO_1(CC1) \cdot V1$$

$$Y_1 = YO_1(CC1) \cdot V1$$

$$K_1 = KO_1(CC1) \cdot V1$$

(6) Second color correction means (6)

The second color component that has been separated is outputted to the addition output means (7) in the form of a CMYK signal ($C_2M_2Y_1K_2$). The color material component ratio of the second color for correction is stored in the group of data register (8) being classified by the color. When these values stored in the register are defined as $CO_2(CC2)$, $MO_2(CC2)$, $YO_2(CC2)$ and $KO_2(CC2)$, CMYK signals of the second color component after correction can be found by the following equations.

$$C_2 = CO_2(CC2) \cdot V2$$

$$M_2 = MO_2(CC2) \cdot V2$$

$$Y_2 = YO_2(CC2) \cdot V2$$

$$K_2 = KO_2(CC2) \cdot V2$$

(7) Addition output means

CMYK signals of the first color component, second color component and black component are added, and final signals Cout, Mout, Yout and Kout are outputted to laser writing system C.

$$Cout = C_1 + C_2 + C_K$$

$$Mout = M_1 + M_2 + M_K$$

$$Yout = Y_1 + Y_2 + Y_K$$

$$Kout = K_1 + K_2 + K_K$$

When the data of the color material component ratio of the first color and that of the second color is changed by a key operation, fine control can be conducted on color, so that highly accurate color correction can be realized.

Next, the color conversion function will be explained as follows.

When data $CI_2(CC2)$, $MI_2(CC2)$, $YI_2(CC2)$ of the second color material component in the first and second color separation means (4) is changed, and also when data $CO_2(CC2)$, $MO_2(CC2)$, $YO_2(CC2)$, $KO_2(CC2)$ of the first and second color material component ratio in the correction means (5), (6), is changed, color conversion can be carried out.

It is necessary to specify a color before conversion and a color after conversion before the processing of color conversion is carried out. In this example, a color before conversion and a color after conversion are specified by prescanning. Specifically, operations are conducted in the following manner: a small area of 5 mm square is provided in a predetermined position on the platen 11 so that a color before conversion and a color after conversion can be read; a document is set on the platen 11 so that a portion of the color before conversion can be set in this position; when a color conversion button provided in a control section is pressed, the mode is changed over to the color conversion mode; and the first prescanning is carried out. As a result of the foregoing, the color before conversion is read as an RGB signal, and C'M'Y' and CC2 can be obtained by the linear masking means (1), black separation means (2) and first and second color separation means (4). The obtained data is adopted for data $C_i'M_i'Y_i'$ and $CC2_i$ of the color before conversion, and the data is temporarily stored in the memory (9).

Next, a sample of the color after conversion is disposed in this area, and the second prescanning is carried out. As a result of the foregoing, the color after conversion is read as an RGB signal, and the aforementioned color correcting operations are carried out. Finally, signals Cout, Mout, Yout and Kout can be obtained from the addition output means (7). These are defined as $C_0$, $M_0$, $Y_0$ and $K_0$, and temporarily stored in the memory (9). After that, data $C'_i$, $M'_i$, $Y'_i$, CC2 of the color before conversion are set in the data register group (8) of $CI_2(CC2_i)$, $MI_2(CC2_i)$, $YI_2(CC2_i)$ as the second color component color material data. As a result of the foregoing, designation of the color before conversion is completed.

Next, $C_0$, $M_0$, $Y_0$, and $K_0$ are set in the data register group (8) of $CO_2(CC2_i)$, $MO_2(CC2_i)$, $YO_2(CC2_i)$ and $KO_2(CC2_i)$. In this case, when $K_0$ is used as it is, the density of black of the output image becomes too high. Therefore, $K_0$ must be adjusted depending on the circumstances.

As a result of the foregoing, designation of the color after conversion is completed.

Then, a document is set in a normal position on the platen 11, and main scanning is conducted, so that the RGB signal of an image is obtained at each pixel. The RGB signals are successively inputted into the color correction device, and final signals Cout, Mout, Yout and Kout are outputted and supplied to laser writing system C on the printer side. In this case, when $CC2 = CC2_i$ in the first and second color separation means (4), the color conversion processing is carried out. That is, the color material component of the color before conversion shown by data $CI_2(CC2_i)$, $MI_2(CC2_i)$, $YI_2(CC2_i)$, the amount of which is V2 calculated at each pixel, is converted into the color material component of the color after conversion shown by data $CO_2(CC2_i)$, $MO_2(CC2_i)$, $YO_2(CC2_i)$, $KO_2(CC2_i)$. As described above, only color can be changed by the color conversion, and the gray balance is not lost. The designation of the colors before and after conversion is carried out by prescanning. Alternatively, the designation may be carried out when data previously stored in the memory (9) is set in the data register group (8).

As described above, color conversion is excellently carried out, and image formation is carried out.

In the case where a color before conversion is roughly designated, that is, in the case where the color before conversion is one of 7 colors of CMYKRGB, it is possible to conduct color conversion only when one of the following data is changed: $CO_1(CC1)$, $MO_1(CC1)$, $YO_1(CC1)$, $KO_1(CC1)$, $CO_2(CC2)$, $MO_2(CC2)$, $YO_2(CC2)$, and $KO_2(CC2)$ that are the color material component ratio data of the first and second colors; and equivalent neutral density data $\alpha_K$, $\beta_K$, and $\gamma_K$ in the black correction means (3). In this case, the color before conversion is limited to the 7 colors of CMY, black, and RGB that are set in the registers of $CI_2(CC2)$, $MI_2(CC2)$ and $YI_2(CC2)$. These 7 colors can be concurrently converted. The color after conversion is specified when prescanning is conducted. Alternatively, data stored in the memory (9) may be used.

The color correction device having a color conversion function of the present invention is explained above. In a recent color copier, image quality is improved in the following manner: the character and photographic regions are automatically discriminated; image processing is differently conducted on the character and photographic regions. In order to discriminate the character and photographic regions, for example, an edge amount is detected by a spatial frequency filter, and in the case where the detected edge amount is larger than a predetermined threshold value, the region is discriminated to be a character region, and in the case where the detected edge amount is not larger than the predetermined threshold value, the region is discriminated to be a photographic region. When the result of discrimination is outputted from the aforementioned discrimination means, image processing is influenced in such a manner that image sharpness and chroma are changed. For example, in the case of a character region, sharpness is increased, and chroma is set high. In the case of black letters, a desirable black letter image can be obtained when only black toner is used for image reproduction. Incidentally, in order to change the processing in accordance with a region such as a character region and a photographic region, it is necessary to conduct real time processing at each pixel.

Figure 4:
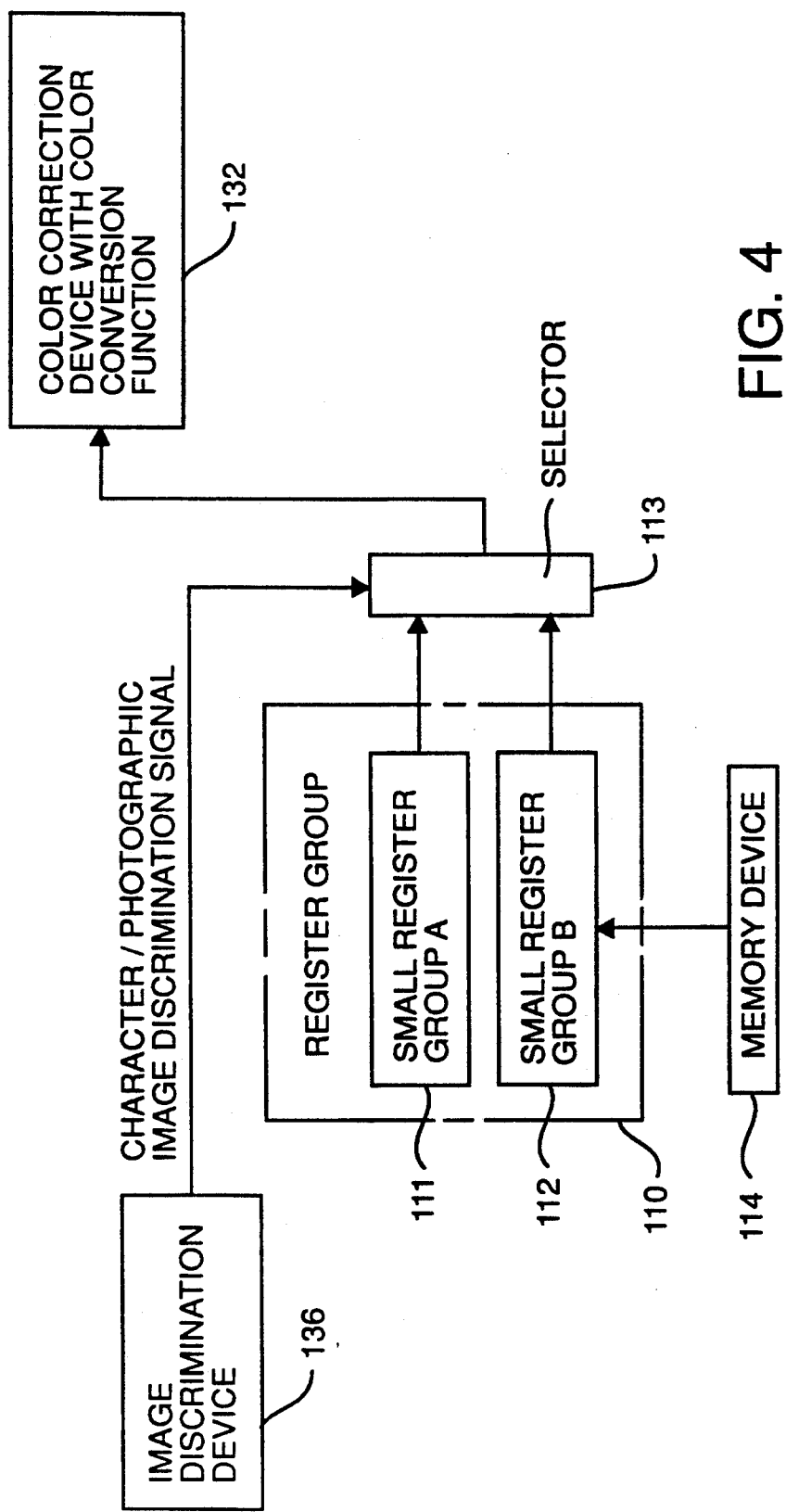
FIG. 4 is a block diagram showing a group of registers and a memory attached to the color correction device having a color conversion function of the present invention.

In order to attain the aforementioned purpose, the chroma must be changed in real time, so that the register group and memory of the color correction device having a color conversion function of the present invention is structured as shown in FIG. 4. The register group 110 is divided into 2 groups, one is a small register group A (111) maintaining parameters for photographic processing, and the other is a small register group B (112) maintaining parameters for character processing. Output of these registers is supplied to the selector 113. The selector 113 selects one of the small register groups 111, 112 in accordance with character and photographic signals sent from the image discrimination device 136, and the obtained data is supplied to the color correction device 132 having a color conversion function.

In a recent color copier, editing function is realized in the following manner: colors in a document is classified into several kinds; and a portion of a specific color is subjected to different image processing. For example, mask trimming is adopted in which a portion of a specific color is erased and extracted. For example, the LUT system in which ROM is used, is adopted for classifying colors. In this system, a digitalized RGB signal is inputted into ROM as an address, and a discrimination result is outputted from ROM. However, it is difficult to rewrite information on ROM, so that it is impossible to conduct readjustment in accordance with the change of mechanical characteristics. Therefore, a color classification method is introduced here in which information calculated in the color correction device of the invention is utilized. Further, it will be explained here that the method can cope with the change of mechanical properties.

Figure 5:
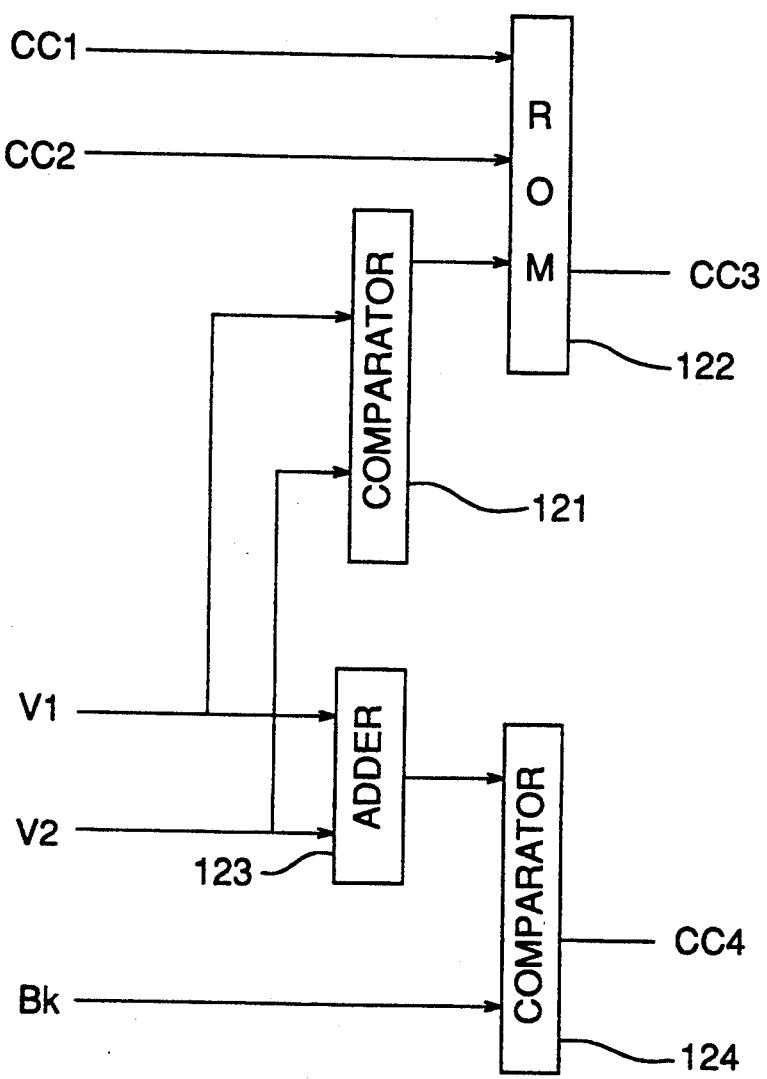
FIG. 5 is a block diagram of a color classification device that is applied to the present invention.

A color classification device classifies colors into 6 kinds, and judges whether a color is close to black or not. Further, the color classification device outputs the result of classification in the form of CC3 and CC4. For example, the color classification device is structured as shown in FIG. 5. First, colors are classified into 6 kinds in the manner explained below. CC1 and CC2 show the results of color classification. For example, when CC1=1 and CC2=3, it can be said from Table 1 that cyan and blue components are existing. However, it can not be known whether the color is close to cyan or blue. Therefore, V1 and V2 are compared in order to find out. First, V1 and V2 are compared by a comparator 121. When V1>V2, the comparator 121 outputs 1, and in other cases, the comparator 121 outputs 0 as a BIT signal. Both CC1 and CC2 are signals of 2 bits, and these signals and signals sent from the comparator 121 are supplied to the ROM122 as an address of 5 bits. In the ROM122, judgment results are previously stored in accordance with the combination of input signals, and the judgment results are outputted as CC3. For example, CC3 is expressed in the form of 3 bit signal, and it ranges from 0 to 7. The values are defined as follows: 0 and 7 are infinite; 1 is red; 2 is magenta; 3 is blue; 4 is cyan; 5 is green; and 6 is yellow.

In order to judge whether a color is close to black or not, an amount of the first and second color components and that of a black component are compared. After V1 and V2 have been added by the adder 123 in FIG. 5, the added value and BK are compared by the comparator 124. As a result, CC4 is outputted. For example, CC4 is a 1 bit signal, and when CC4=0, it means that the color is close to black, and when CC4=1, it means that the color is chromatic.

These input signals CC1, CC2, V1, V2 and BK are signals that have been corrected by the color correction device having a color conversion function. Accordingly, when an operator conducts an adjustment operation of color correction, these input signals are automatically adjusted. This means that the color classification device of the invention can cope with the change of functional characteristics. When the bit number of signals inputted into the comparators 121 and 124 is changed (for example, V1 is changed to 3 bit, V2 is changed to 4 bits, and further BK is changed to 6 bits), the results of discrimination is changed so that color classification can be adjusted.

Figure 6:
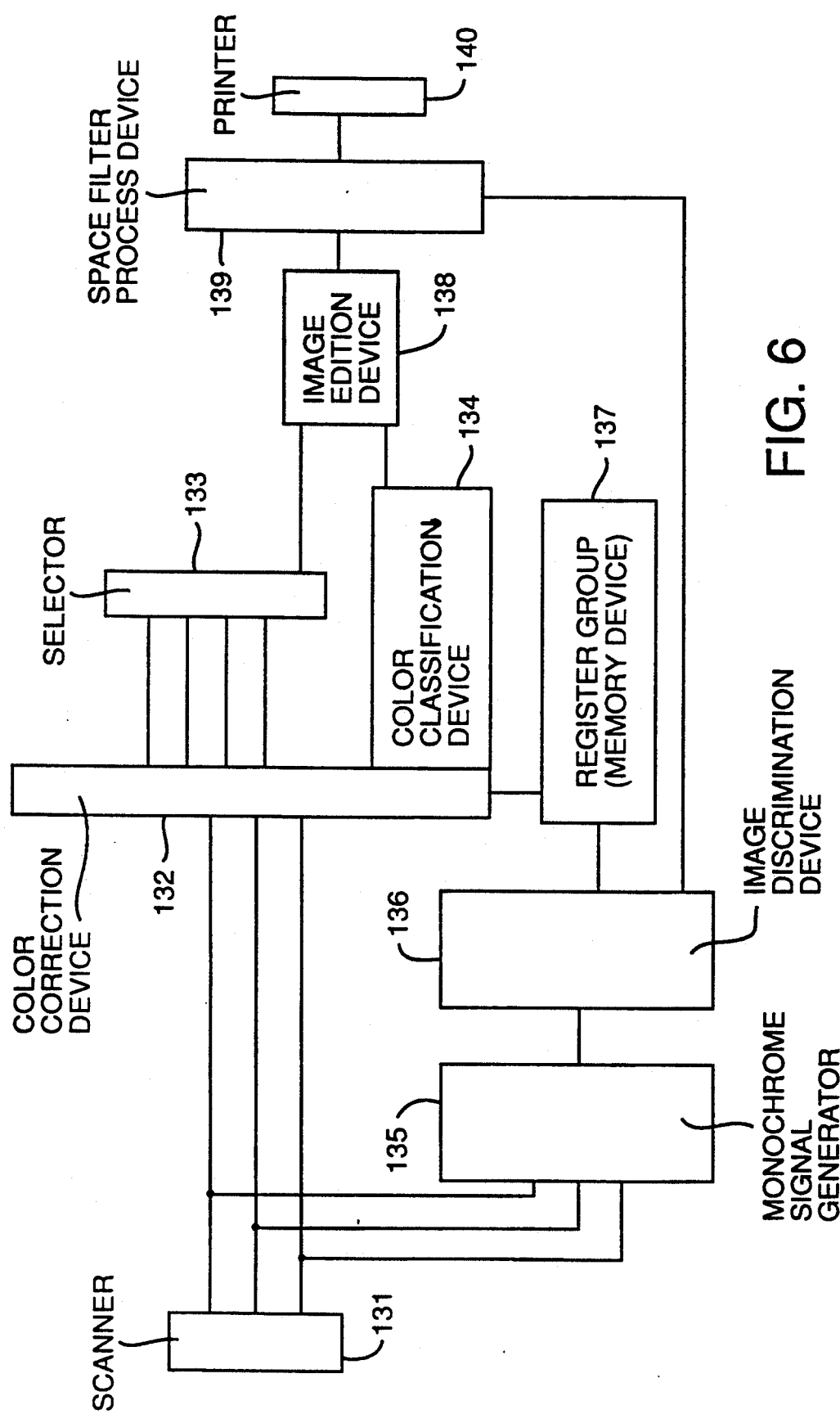
FIG. 6 is a block diagram showing the processing of a device having a color classification function of a color copier to which the present invention is applied.

FIG. 6 is a block diagram showing the processing. An RGB signal outputted from the scanner 131 is supplied to the color correction device 132 having a color conversion function, and the monochromatic signal generator 135. The monochromatic signal generator 135 generates a monochromatic signal from the RGB signal, and the generated monochromatic signal is supplied to the image discrimination device 136. In the image discrimination device 136, the character and photographic regions are discriminated by monochromatic signals corresponding to a plurality of pixels, and the result of discrimination is outputted into the register group 137 and the filter processing device 139. According to the result of discrimination, one of the small register groups A111 and B112 is selected in the register group 137. A parameter stored in the selected small register group is supplied to the color correction device 132 having a color conversion function. In the color correction device 132 having a color conversion function, color correction processing is carried out according to the supplied parameter. Then, one of the color signals Y, M, C and K is selected and outputted by the selector 133 in accordance with the scanning code. In the color classification device 134, color are classified in the aforementioned manner thereby using data CC1, CC2, V1, V2 and BK calculated by the color correction device 132 having a color conversion function. The obtained results, CC3 and CC4 are supplied to the image editing device 138. Concurrently, the image editing device 138 receives a color signal sent from the selector 133, and conducts image editing processing such as masking and trimming in accordance with image classification results CC3 and CC4. Then, the processed color signal is supplied to the spatial filter processing device 139. In the spatial filter processing device 139, a filter coefficient is changed in accordance with the discrimination result sent from the image discrimination device 136. As a result of the foregoing, image sharpness is changed at each character and photographic region. A color signal outputted from the filter processing device 139 is supplied to the printer 140, and a color image is formed by the printer 140.

According to the present invention, color correction is carried out very accurately, and when data of the color material component ratios of 7 colors (Y, M, C, K, R, G and B) are controlled through an operation key, each color can be independently adjusted. For example, it is possible to adjust only the tone of red without changing a gray balance and the tone of blue and green. Even when the tone of each color is not strictly corrected in the process of linear masking (1), the tone of each color can be adjusted when a parameter is adjusted. Accordingly, even when the input and output devices are fluctuated, the color tone can be appropriately adjusted. Further, only when a parameter is adjusted, color conversion can be carried out, which can be performed without losing a gray balance.

An unnatural color boundary does not appear after color conversion, so that partial color correction is not necessary. Further, hardware for color conversion is not required in particular. Therefore, a color correction device having a color conversion function can be proposed at relatively low cost. Furthermore, according to the present invention, the chroma can be changed in real time, and color classification can be also conducted. Consequently, a color correction device having a color conversion function appropriate for image processing performed in a color copier can be provided.

What is claimed is:

1. An apparatus for producing CMYK color component signals, which correspond to cyan, magenta, yellow, and black color components, respectively, for each pixel from RGB color component signals, which correspond to red, green, and blue color components, respectively and are photoelectrically obtained for each pixel by an image scanner from an original image, and for changing the CMYK color component signals to CoMoYoKo recording color component signals, wherein each of the signals represents a density level of the corresponding color component, the apparatus comprising:

means for inputting a specified color to be changed, color component ratio of the specified color, an output color to which the specified color is to be changed, and color component ratio of the output color;

means for converting the RGB color component signals for each pixel into CMY color component signals;

first separating means for extracting black sub-components from the CMY color components to form a black color from the CMY color component signals sub-component signals corresponding to the black sub-components, and further outputting C'M'Y' color component signals corresponding to the CMY color components remaining after the black sub-components are extracted, wherein at least one of the C'M'Y' signals has a signal level of zero;

second separating means for separating the C'M'Y' color component signals into first color sub-component signals and second color sub-component signals in such manner that the second separating means determines a representative color for the second color sub-component signals that is a complimentary color of the zero-level color component signal of the C'M'Y' color component signals for each pixel, judges whether the color of the representative color is the specified color and provides the representative color with the color component ratio of the specified color when the color of the representative color is judged to be the specified color, extracts color sub-components from the C'M'Y' color components to form the representative color after judging has occurred, outputs signals, which correspond to the color sub-components of the representative color, as the second color sub-component signals, and outputs C"M"Y" color component signals, which correspond to the color components still remaining after the color sub-components of the representative color have been extracted, as the first color sub-component signals;

means for correcting the black color sub-component signals, the first color sub-component signals, and the second color sub-component signals, respectively, wherein correction is in accordance with the color component ratio of the output color when the color of the representative color is judged to be the specified color; and means for adding the corrected black color sub-component signals, the corrected first color sub-component signals, and the corrected second color sub-component signals so as to form the CoMoYoKo recording color component signals.

2. The apparatus of claim 1, wherein the second separating means determines the color of the C"M"Y" color components as one of cyan, magenta, and yellow.

3. The apparatus of claim 2, wherein the second separating means labels the representative color of the second color sub-components and the determined color of the first color sub-components with color codes.

4. The apparatus of claim 1, further comprising memory means for storing processing data.

5. The apparatus of claim 4, wherein the memory means stores black sub-component ratio data, and the first separating means extracts the black sub-components from the CMY color component signals on the basis of the black sub-component ratio data.

6. The apparatus of claim 4, wherein the memory means stores red, green, and blue sub-component ratio data, respectively, and the second separating means extracts the color sub-components of the representative color from the C'M'Y' color component signals on the basis of one of the red, green, and blue sub-component ratio data corresponding to the representative color when the color of the representative color is judged not to be the specified color.

7. The apparatus of claim 4, wherein the memory means stores black color sub-component correction data, first color sub-component correction data, and second color sub-component correction data, respectively, and the correcting means corrects the black sub-components, the first color sub-components, and the second color sub-components on the basis of the corresponding correction data.

8. The apparatus of claim 7, wherein each of the correction data indicates a ratio among the color sub-components to form the corresponding color sub-component signal.

9. An apparatus for producing CMYK color component signals, which correspond to cyan, magenta, yellow, and black color components, respectively, for each pixel from RGB color component signals, which correspond to red, green, and blue color components, respectively, and are photoelectrically obtained for each pixel by an image scanner from an original image, and for changing the CMYK color component signals to CoMoYoKo recording color component signals, wherein each of the signals represents a density level of the corresponding color component, the apparatus comprising:

means for inputting a specified color to be changed, color component ratio of the specified color, an output color to which the specified color is to be changed, and color component ratio of the output color;

means for converting the RGB color component signals for each pixel into CMY color component signals;

first separating means for separating the CMY color component signals of each pixel into black color sub-component signals and C'M'Y' color component signals, wherein at least one of the C'M'Y' color component signals has a signal level of zero second separating means for separating the C'M'Y' color component signals into first color sub-component signals and second color sub-component signals, wherein the second separating means determines a representative color for the second color sub-component signals that is a complementary color of the zero-level color component signal of the C'M'Y' color component signals and color component ratio of the representative color, judges whether the color of the representative color is the specified color and replaces the color component ratio of the representative color with the color component ratio of the specified color when the color of the representative color is judged to be the specified color, outputs second color sub-component signals in accordance with the color component ratio of the representative color after judging has occurred so that the second color sub-component signals include two non-zero-level sub-component signals of the C'M'Y' color component signals, and subtracts the second color sub-component signals from the C'M'Y' color component signals to output the first color sub-component signals so as to include no more than one non-zero-level sub-component signal of the C'M'Y' color component signals;

means for correcting the black color sub-component signals, the first color sub-component signals and the second color sub-component signals, respectively, in accordance with corresponding color component ratio for each pixel, wherein correction is in accordance with the color component ratio of the output color when the representative color is judged to be the specified color; and means for adding the corrected black color sub-component signals, the corrected first color sub-component signals, and the corrected second color sub-component signals so as to form the CoMoYoKo recording color component signals.

10. The apparatus of claim 9, wherein the inputting means inputs all of red, green, and blue as the specified colors, the color component ratio of each of the specified colors, and the color component ratio of the output color for each of the specified colors; and further wherein the second separating means replaces the color component ratio determined for the representative color of the second color sub-component signals with the color component ratio of the corresponding specified color for each pixel.

11. The apparatus of claim 9, further comprising memory for storing each specified color and color component ratio.

12. The apparatus of claim 9, wherein the image scanner is used as the inputting means so that a color sample is read by the image scanner and the representative color of the color sample, as determined by the second separating means, is used as at least one of the specified color and the output color.

13. The apparatus of claim 9, wherein the specified color, the output color, and the representative color are each labeled with color codes.

14. The apparatus of claim 9, wherein the signal level of each of the corrected second color sub-component signals is determined on the basis of the signal levels outputted for the second color sub-component signals and the color component ratio of the output color when the representative color is judged to be the specified color.

* * * * *

UNITED STATES PATENT AND TRADEMARK OFFICE
CERTIFICATE OF CORRECTION

PATENT NO. : 5,329,385
DATED : July 12, 1994
INVENTOR(S) : Koji WASHIO

It is certified that error appears in the above-identified patent and that said Letters Patent is hereby corrected as shown below:

Claim 1, column 12, line 64 after "tively" insert --,--.

Claim 1, column 13, line 14 after "signals" (first occurrence) insert --, the first separation means outputting black color--.

Claim 1, column 13, line 27 change "compli-" to --comple--.

Claim 9, column 14, line 52 after "zero" insert --;--.

Signed and Sealed this

Second Day of May, 1995

Attest:

BRUCE LEHMAN

Attesting Officer

Commissioner of Patents and Trademarks